United States Patent [19]

Ko

[11] Patent Number: 5,585,311
[45] Date of Patent: Dec. 17, 1996

[54] CAPACITIVE ABSOLUTE PRESSURE SENSOR AND METHOD

[75] Inventor: Wen H. Ko, Cleveland Hts., Ohio

[73] Assignee: Case Western Reserve University, Cleveland, Ohio

[21] Appl. No.: 630,519

[22] Filed: Apr. 10, 1996

Related U.S. Application Data

[62] Division of Ser. No. 343,712, Nov. 22, 1994, Pat. No. 5,528,452.

[51] Int. Cl.$^6$ .......................... H01G 7/00; H01G 21/302
[52] U.S. Cl. .................. 437/228; 361/283.4; 437/225; 156/633.1; 216/2
[58] Field of Search ........................... 361/283.1, 283.2, 361/283.4; 73/715, 718, 729; 29/25.41, 25.42; 437/225–228, 919, 921, 901, 7

[56] References Cited

U.S. PATENT DOCUMENTS

| | | |
|---|---|---|
| 4,609,966 | 9/1986 | Kuisma . |
| 4,838,088 | 6/1989 | Murakami . |
| 4,875,134 | 10/1989 | Kuisma . |
| 5,145,810 | 9/1992 | Matsumi .................................. 437/228 |
| 5,201,228 | 4/1993 | Kojima et al. . |
| 5,241,864 | 9/1993 | Addie et al. . |
| 5,264,075 | 11/1993 | Zanini-Fisher et al. ............. 156/633.1 |
| 5,320,705 | 6/1994 | Fujii et al. ........................... 156/630.1 |
| 5,332,469 | 7/1994 | Mastrangelo ................................. 216/2 |

*Primary Examiner*—Leo P. Picard
*Assistant Examiner*—Phuong T. Vu
*Attorney, Agent, or Firm*—Fay, Sharpe, Beall, Fagan, Minnich & McKee

[57] ABSTRACT

A capacitive absolute pressure sensor. The sensor includes a substrate having an electrode deposited thereon and a diaphragm assembly disposed on the substrate. As pressure increases, the diaphragm deflects, touches the electrode (in the touch mode), and changes the capacitance of the sensor. The changed capacitance is sensed to thus sense pressure changes. A buried feedthrough is used to sense the change in a capacitance in a chamber under the diaphragm and thus determine the pressure sensed. A vacuum in the chamber is maintained by proper selection of a thickness of a sensing electrode and an insulating layer, exposition thereof to a thermal cycle, and the hermetic bonding of the diaphragm assembly to the substrate.

9 Claims, 5 Drawing Sheets

CAPACITIVE ABSOLUTE PRESSURE SENSOR AND METHOD

This is a divisional of application Ser. No. 08/343,712 filed on Nov. 22, 1994, now U.S. Pat. No. 5,528,452.

BACKGROUND OF THE INVENTION

This invention relates to a device for sensing pressure in industrial applications. More particularly, the invention is directed to a capacitive absolute pressure sensor having good stability, low power consumption, robust structure, large over pressure protection range, and good linearity and increased sensitivity when zero suppression is used.

While the invention is particularly directed to the art of capacitive absolute pressure sensors, and will thus be described with specific reference thereto, it will be appreciated that the invention may have usefulness in other fields and applications such as in accelerator and force sensors and diaphragm type actuators.

The present invention preferably operates in the touch mode. Touch mode sensors have been disclosed, for example, in Ding et al., *Touch Mode Silicon Capacitive Pressure Sensors*, 1990 ASME Winter Annual Meeting, Nov. 25, 1990.

Briefly, touch mode sensors can be described as follows. In, for example, capacitive pressure sensors using some type of diaphragm (whether or not in the touch mode) when a pressure is impressed upon the diaphragm, the diaphragm deflects. The deflection necessarily changes the gap below the diaphragm. The change in gap results in a capacitance change which is sensed and used to determine a measurement of the pressure. In the touch mode, the diaphragm is deflected to actually touch the surface therebeneath. The area that is touched is a factor in the magnitude of the change of capacitance.

However, the disclosed sensors do not possess the useful characteristics of the present invention such as a vacuum sealed gap, or the connection to the area beneath the diaphragm using buried electrode structures to achieve electrical feedthrough for convenient sensing operations. Moreover, the disclosed sensors had stability and hysteresis problems which are overcome in the present invention.

Additionally, U.S. Pat. No. 5,264,075 to Zanini-Fisher et al. discloses a fabrication method for silicon/glass capacitive absolute pressure sensors. The disclosed method of fabrication, however, is extremely complicated and results in a structurally distinct sensor.

Generally speaking, conventional capacitive absolute pressure sensors operate in a limited temperature range of approximately −50° to 100° C. Further, no known sensors can withstand both specified operating temperature and pressure and much higher (many times the operating values) manufacturing temperature and pressure. For example, molding the sensor into a tire is but one illustration of an environment where conventional sensors fail to meet these desired criteria. Moreover, most known commercial devices of low and moderate costs have a base line drift problem with time in the field. Thus, the accuracy is typically worse than ±1% over approximately one year in the field, without calibration. The present design is able to overcome these industrial application problems.

For absolute capacitive pressure sensors, one of the most difficult problems is the design and fabrication of electrical feedthroughs from the hermetically sealed reference cavity to an area that can be conveniently accessed for sensing. A low cost, reliable and wafer-level fabricating technique for electrical feedthrough is, consequently, becoming more and more important for the sensor manufacture and packaging.

Several electrical feedthrough structures have been developed. One of these approaches is a vacuum seal by using a PN Junction Feedthrough. In this technique, N-type silicon is used to form the upper sensor/diaphragm structures. The upper electrode is a P+ silicon diaphragm. The bottom electrode, however, is made by two separate metal patterns on the glass substrate wafer. The diffused $P^+$ feedthroughs are fabricated on N-type silicon and are used to connect the two parts during the anodic (electrostatic) bonding process. Therefore, a hermetic sealed cavity with multiple feedthroughs can be fabricated by this technique on a wafer-level process.

This feedthrough structure, however, is subject to problems associated with P-N junctions. Improper protection of junctions degrades the sensor performance due to junction noise and reverse leakage currents. In addition to the protection of the junction, ion implantation is suggested to form the $P^+$ feedthroughs in order to reduce surface steps caused by the diffusion. Thus, the number of improvements required to fabricate a high performance pressure sensor is excessive.

Other crude techniques that possess fabrication and/or operational deficiencies have been developed. In one technique, an electrical feedthrough channel is etched in a silicon dividing wall. After joining the silicon diaphragm assembly and glass substrate together by electrostatic (anodic) bonding, the substrate electrode is brought out from the chamber to the outside bonding pad through the small channel. In order to achieve a hermetically sealed cavity for the absolute capacitive pressure sensor, this small hole of the feedthrough channel is sealed. A glass frit is used as the sealant for this purpose.

A direct vacuum seal is performed in a vacuum furnace. The device, with glass frit of proper composition applied to seal the channel, is put into the vacuum furnace and heated to a defined temperature-time curve at which the glass frit melts. Then the furnace is cooled to room temperature and the electrical feedthrough is thus sealed.

Another relatively crude approach to seal the reference cavity with a wafer-level process is a vacuum seal by sputtering Pyrex glass film over a channel opening. A channel with a one micron depth is etched in the silicon in order to facilitate the sealing process. A silicon mask to block most areas of the device except the channel regions is made. This mask is aligned to the device wafer and fixed together. Then the composite wafers are sent to the sputtering machine. A 3-micron glass film, or other type of insulating film, is sputter deposited to seal the 1-micron depth channel.

The present invention contemplates a new and improved capacitive absolute pressure sensor which resolves the above-referenced difficulties and others.

SUMMARY OF THE INVENTION

A high reliability, robust capacitive absolute pressure sensor is realized. The sensor includes a substrate having an electrode deposited thereon and a diaphragm assembly hermetically bonded to the substrate. Preferably, as pressure increases, the diaphragm deflects and touches the electrode (touch mode operation), thus changing the capacitance under the diaphragm. A buried feedthrough technique is used to effectively extend the electrode on the substrate out from under the diaphragm to sense the change in capacitance and thus determine the pressure sensed.

In another aspect of the invention, a hermetic seal is provided to the sensor to seal the area of the sensor where the electrode is fed through from under the diaphragm to an accessible portion of the sensor.

In another aspect of the invention, the method for forming the sensor comprises etching first and second gaps on a first side of a silicon wafer so that the gaps are separated by a dividing wall to form a sensor chamber and an electrode chamber. A metal electrode is then deposited on a separate glass, silicon or other suitable substrate and a layer of glass deposited over the metal. The wafer and the separate glass substrate are bonded. A second side of the wafer opposite the first side is then etched to form a diaphragm and a detection area on the sensor. The electrode is fed through from under the dividing wall to the electrode chamber area and sealed.

In another aspect of the invention, the sealing comprises proper selection of the thickness of the electrode and the layer of glass.

In another aspect of the invention, the sealing comprises subjecting the electrode and layer of glass on the glass, silicon or other suitable substrate to a thermal cycle.

In another aspect of the invention, the sensor is constructed to have a robust design to withstand harsh environments associated with manufacturing, installation, and/or use.

An advantage of the present invention is that sensing and detection of pressure is realized in a simple construction.

Another advantage of the present invention is that stability, high performance, and high reliability result from the robust design.

Another advantage is that a convenient feedthrough of the electrode for sensing is accomplished with a proper selection of materials and a selected thermal cycle.

Another advantage is that, in the preferred touch mode, the sensor exhibits desirable linear characteristics with zero suppression, overload protection, and high sensitivity.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination, of the various parts of the device, whereby the objects contemplated are attained as hereinafter more fully set forth, specifically pointed out in the claims, and illustrated in the accompanying drawings in which:

FIG. 3 is a top view of the device of FIG. 1;

DETAILED DESCRIPTION OF THE PREFERRED EMBODIMENT AND METHOD

A silicon capacitive absolute pressure sensor according to the present invention has the advantages of good stability, low power consumption, robust structure, large over pressure tolerance, large range and a built-in feature of using zero-suppression for increased linearity and sensitivity. The present invention is directed to the design, fabrication and packaging of silicon absolute pressure sensors for industrial and other applications where time stable operation over wide measurement ranges in difficult environments is required. The present sensor preferably operates in the touch mode with a zero suppression feature. However, non-touch mode operation is also usable. The present design approaches, and package techniques, result in unique performance.

The performance data of the present capacitive absolute pressure sensor is summarized as follows:

Operating temperature of $-150°$ to $200°$ C.;

Pressure range: can be designed to cover $10^{-4}$ to $10^3$ psi full scale;

Overload pressure: 200% to 200,000% full scale, or 500 psi.;

Manufacturing pressure up to 500 psi for a few hours;

Manufacturing temperature up to 300° C. for a few hours;

Accuracy of ±1.5% of full scale over 5–10 years;

Hysteresis less than 1% full-scale over 5–10 years; and,

Power supply—3 to 30 volts (5–15 milliwatts) (using CP-10 capacitance to voltage interface circuit).

Figure 1:
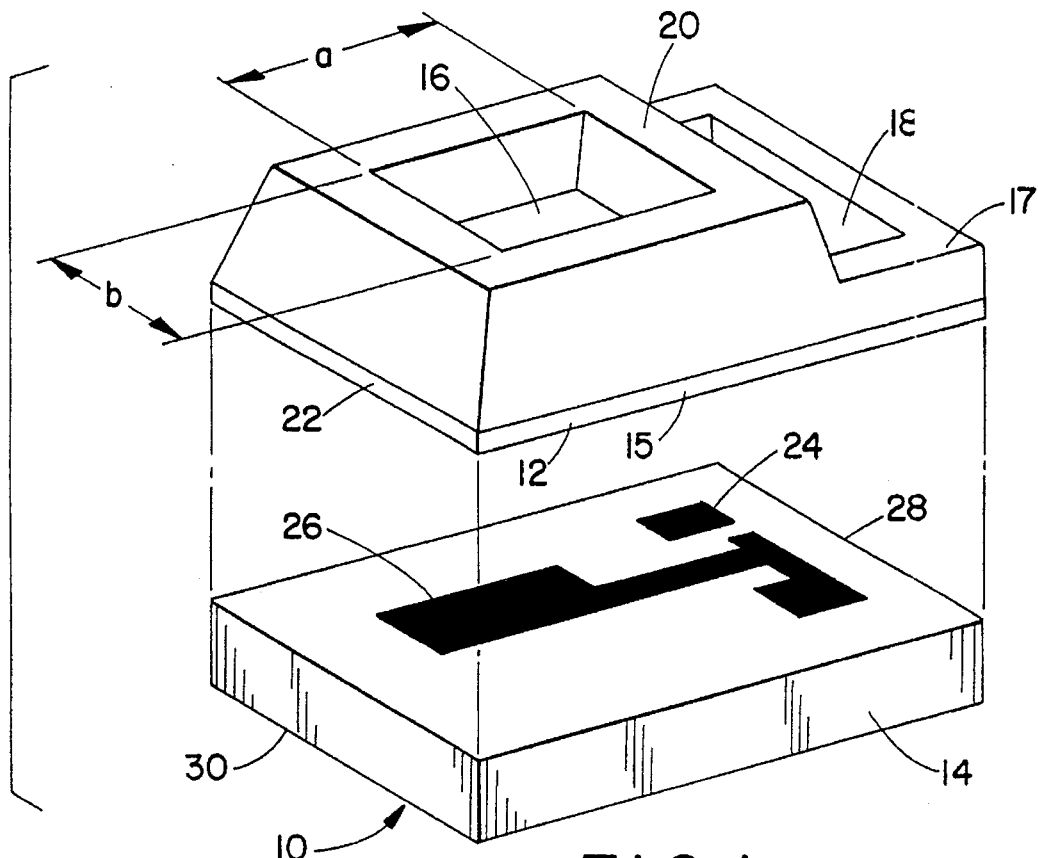
FIG. 1 is an assembly view of the preferred embodiment of the invention.
Figure 2:
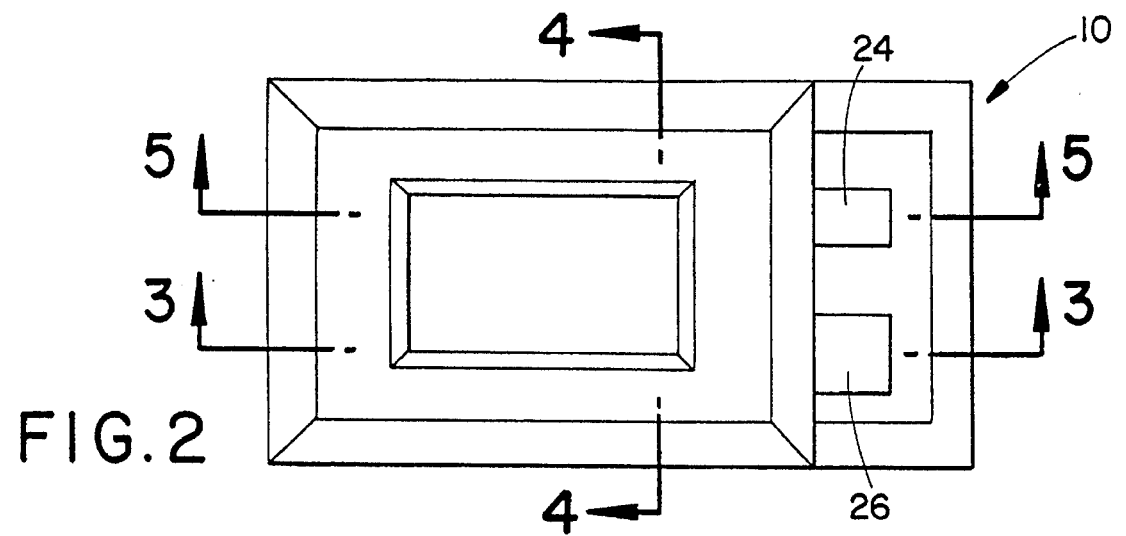
FIG. 2 is a top view of the device of FIG. 1.

Referring now to the drawings wherein the showings are for purposes of illustrating the preferred embodiments of the invention only and not for purposes of limiting same, FIGS. 1 and 2 provide a view of the overall preferred embodiment. A sensor 10 comprises two major components, a silicon diaphragm assembly 12 and a glass or silicon substrate 14.

The assembly 12 is preferably square or rectangular and formed with Boron-doped (P$^+$) silicon using a P+ etch stop technique (or may be N-doped silicon using a P-N junction etch stop technique). The diaphragm assembly 12 includes a region 15 across which a diaphragm 16 is disposed and a region 17 having opening 18, the regions being defined by a relatively thick dividing wall 20 and relatively thick frame 22.

Electrode 26, preferably comprised of three metal layers, two outside layers of chromium and an inner layer of platinum (Cr—Pt—Cr), is formed on the substrate 14. The chromium layers of the electrodes provide bonding advantages while the platinum layers allow for good conductivity. The electrode 24 is used to contact the diaphragm 16 and is disposed substantially in a portion 28 disposed below the opening 18. Further, as will be described with reference to FIGS. 4 and 5, the electrode 24 is not directly on the substrate 14 but on an insulating layer that is on the substrate. The electrode 26 spans the portion 28 and a portion 30 aligned with the diaphragm 16.

The exact dimensions of the sensor vary as a function of the pressure range and maximum temperature/pressure the sensor need withstand. For example, in a sensor having an operating pressure of approximately 100 psi, a maximum pressure of 400 psi, and a maximum temperature of 250° C., the width b of the diaphragm 16 is 250 microns, the length a of the diaphragm 16 is 750 microns, the thickness of the wall 20 is 500 microns, and the height of the wall 20 is 300 microns which is the thickness of a 75 mm silicon wafer. The frame 22 is sized to correspond to the thickness and height of the wall 20. It is recognized that any suitable dimensions may be used so long as the objectives of the present invention are attained.

Significantly, as is apparent from the preferred aforenoted dimensions, the wall 20 and frame 22 are fabricated as thick, robust structures. The advantage to such a design is that the sensor 10 withstands manufacture, installation, and operation temperature and pressure extremes. The sensor is particularly adaptable to be used in relatively harsh conditions such as those associated with molding the sensor into an automobile tire and sensing pressure thereof. As those skilled in the art will appreciate, suitable electronics may be implemented along with the sensor to monitor the capacitive (voltage) changes detected by the sensor. Further, electronics may also be utilized to conduct such monitoring from a remote location.

Figure 3:
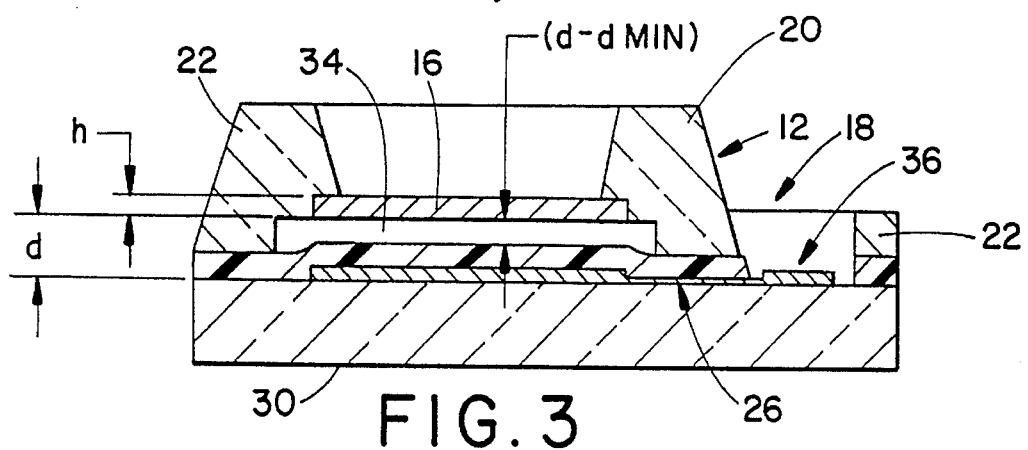
FIG. 3 is a cross sectional view of the device of FIG. 1 (along line 3—3 of FIG. 2)

Referring now to FIG. 3, with continuing reference to FIGS. 1 and 2, the diaphragm assembly 12 is electrostatically bonded to the substrate 14 to construct the capacitive pressure sensor 10. The capacitance of the sensor 10 is determined by the area of the diaphragm 16 (a×b) and electrode 26, the gap under the diaphragm ($d-d_{min}$) and the permittivity of air or vacuum. The capacitance is as follows:

$$C = \iint \frac{\epsilon_o \, dxdy}{\left( d - d_{min} \frac{\epsilon_g - \epsilon_o}{\epsilon_g} \right)} \quad [1]$$

where dxdy=dA—elementary area on the diaphragm $\epsilon_o$=permittivity of air or vacuum $\epsilon_g$=permittivity of glass (layer 32)

d=distance between the diaphragm and substrate

Thus, in the touched area (in the touch mode):

$d=d_{min}$

So, $$\left( d - d_{min} \frac{\epsilon_g - \epsilon_o}{\epsilon_g} \right) \rightarrow d_{min} \frac{\epsilon_o}{\epsilon_g}$$

and $$C = \iint \frac{\epsilon_g \, dxdy}{d_{min}} \quad [2]$$

The gap, d, is formed by silicon etching (as will be described with reference to FIGS. 8(a)–8(i)) and $d_{min}$ is a selected thickness of an insulating layer 32 on the electrode 26. That is, $d_{min}$ is the distance between the top of the insulating layer and the substrate. Any variations of $d_{min}$, as illustrated by, for example, the curvature of the insulating layer over the electrode in FIG. 3, is considered negligible. Since a P⁺ etch-stop technique is preferably used to form the silicon diaphragm, the thickness of the diaphragm, h, depends on the thickness of the P⁺ layer which can be precisely controlled. Preferably, $d_{min}$ is approximately 0.3–3.0 microns in all relevant regions. However, any suitable dimensions of $d_{min}$, as well as all other components, may be selected so long as the advantages of the invention are achieved.

A vacuum sealed chamber 34 is formed under the diaphragm 16. The electrode 26 extends under the wall 20 and connects a bonding pad 36 of the electrode 26 (disposed in opening 18) to the electrode 26 in the sealed vacuum chamber 34. Accordingly, the capacitive changes of the chamber 34 resulting from pressure changes on diaphragm 16, are advantageously detected.

Figure 5:
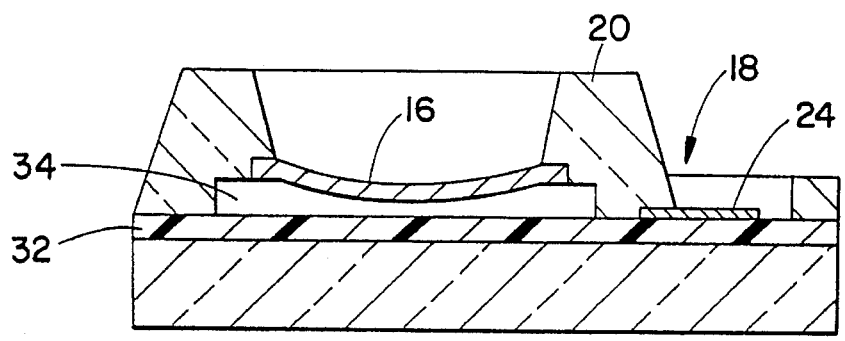
FIG. 5 is a cross sectional view along line 5—5 of FIG. 2.
Figure 4:
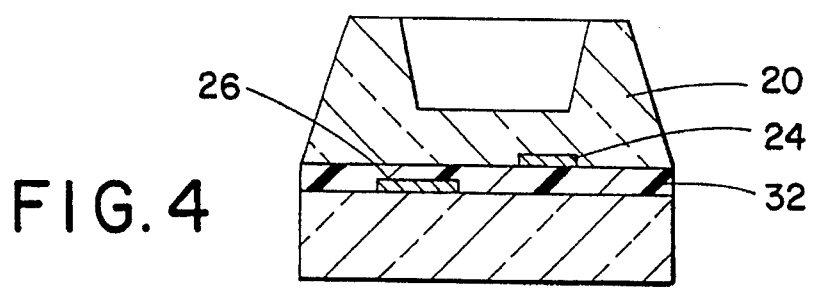
FIG. 4 is a cross sectional view along line 4—4 of FIG. 2.

FIGS. 2, 4, 5 illustrate the relative positions of electrodes 24 and 26. The electrode 26 has the insulating layer 32 deposited thereon. The electrode 24 is disposed on the insulating layer 32 so that the insulating layer 32 lies between and separates/stratifies the electrodes, as shown in FIG. 4. The electrode 24 is further illustrated in FIG. 5 as extending partially under the dividing wall 20 but not through to the chamber 34, thus making contact to the diaphragm 16 through wall 20 while maintaining the vacuum state of the chamber 34.

Figure 6:
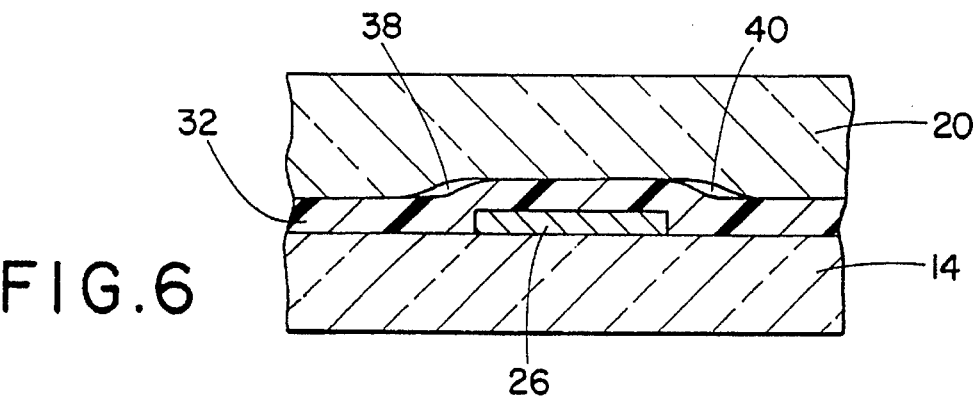
FIG. 6 is a partial cross sectional view of the device of FIG. 1 illustrating undesired gaps that fail to seal.
Figure 7:
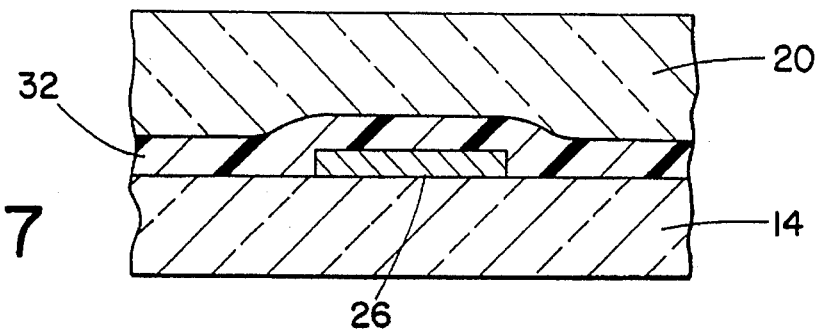
FIG. 7 is a partial cross sectional view of the device of FIG. 1 illustrating the preferred seal.

As can be seen in FIGS. 3 and 4, the electrode 26 extends under the dividing wall 20 from the chamber 34 to the opening 18. A difficulty arises in this arrangement with respect to maintenance of the vacuum state of the chamber 34. Specifically, as those skilled in the art will appreciate, for example, gaps 38 and 40 are developed between the dividing wall 20 and the insulating layer 32 as a result of the edges of the electrode 26 creating a small ridge, or bump, in the insulating layer under dividing wall 20 (FIG. 6). These gaps 38 and 40 prevent a reliable vacuum state of the chamber 34 to be realized. To overcome this difficulty, in the preferred embodiment, as shown in FIG. 7, the thicknesses of the electrode 26 and the insulating layer 32, i.e., $d_{min}$, are carefully selected and a bonding and/or thermal process designed such that the insulating layer 32 conforms, or deforms, to seal gaps 38 and 40. Preferably, in the region underlying the wall 20, the thickness of electrode 26 is approximately 0.1–0.3 microns and the thickness of the layer 32 is approximately 0.3–3.0 microns. Accordingly, a vacuum seal is maintained at the interface of the dividing wall 20 and the insulating layer 32 and at the interface of the electrode 26 and the insulating layer 32.

The method for forming a sensor 10 with buried feedthrough is shown in FIGS. 8(a)–(i). As shown, the process starts with <100> p-type silicon wafer 42 (FIG. 8(a)). KOH (or any other suitable etchant) is used to etch the silicon wafer to obtain the desired gaps 44, 46 in the wafer 42 (FIG. 8(b)). Then boron diffusion is carried out to define the P⁺ layer diaphragm thickness h (FIG. 8(c)).

The glass substrate 14 is prepared before electrostatic bonding to the wafer 42. The electrode 26 is sputtered (FIG. 8(d)) and then buried under the insulating layer 32 of sputtered 7740-type glass or equivalent glass composition (FIG. 8(e)), which ultimately isolates the electrode 26 from the diaphragm 16 when the diaphragm touches the bottom of the chamber 34. Then the insulating layer over the bonding pad 36 (FIG. 3) is removed by etching the glass with a mask. The electrode 24 is also eventually sputtered on layer 32 to contact wafer 42 (diaphragm 16).

Preferably, a thermal cycle is performed on the combination of the substrate 14, the electrode 26 and the insulating layer 32. First, the combination is heated to 500° C. to 550° C. for approximately one-half hour so that the layer 32 deforms around the electrode 26. Second, a temperature of approximately 350° C.–400° C. is then applied for approximately one-half hour. This allows the glass in the combination to relax and equalize, resulting in a desirable temperature coefficient. Then, the silicon wafer 42 is electrostatically bonded to the glass substrate 14 at 350° C. to 400° C. (FIG. 8(f)). Last, the combination is slowly cooled for approximately one hour.

Figure 8A:
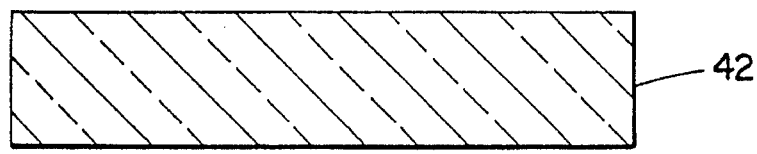
FIGS. 8(a)–8(i) illustrate the preferred method of forming the device of FIG. 1.
Figure 8B:
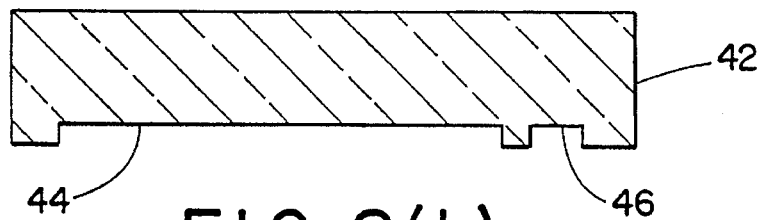
Figure 8C:
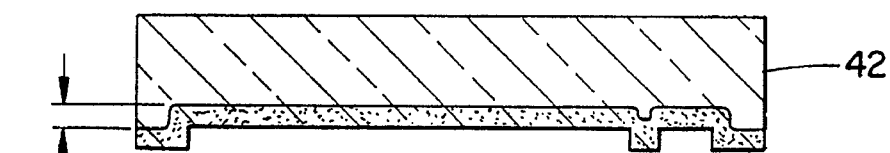
Figure 8D:
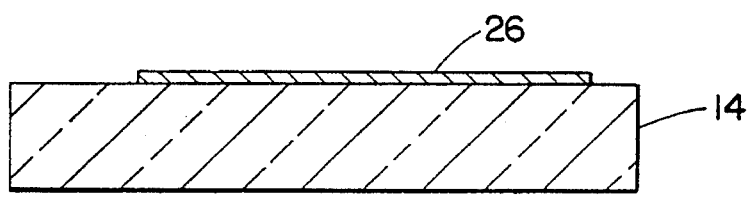
Figure 8E:
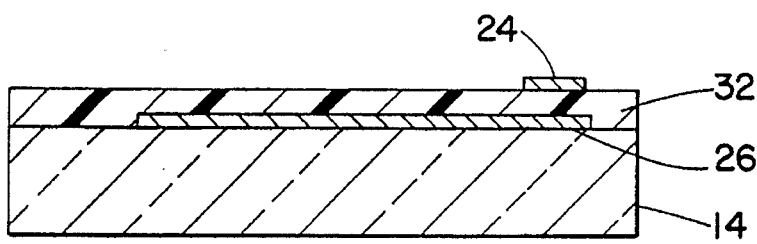
Figure 8F:
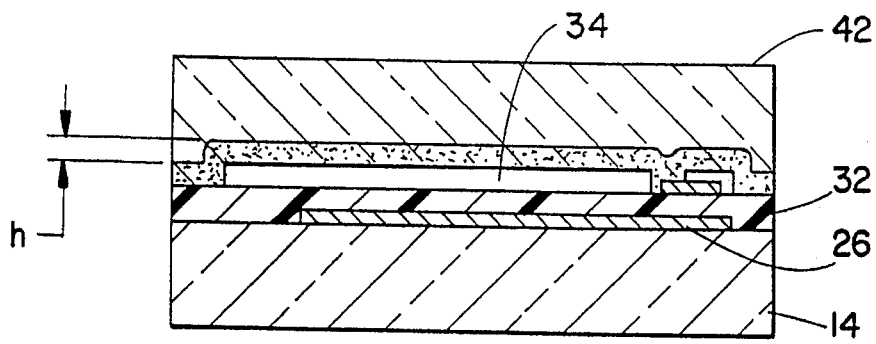
Figure 8G:
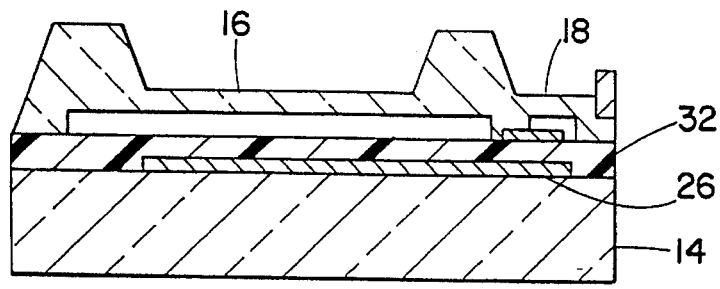
Figure 8H:
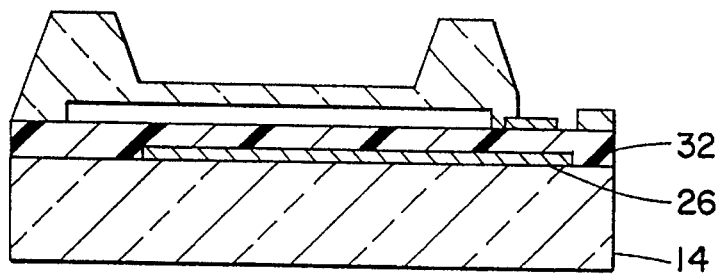
Figure 8I:
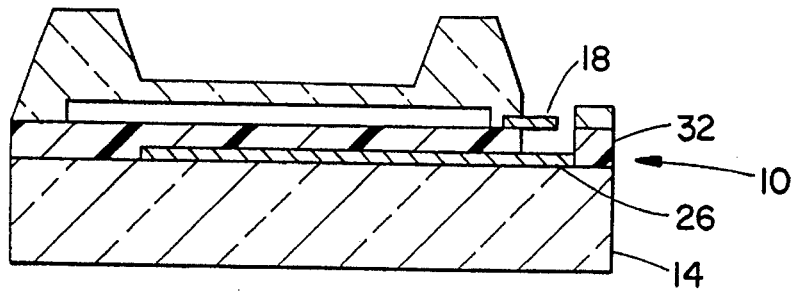

A deep silicon etch of the wafer 42 is then performed using EDP (or KOH or other suitable etching solution) to form the diaphragm 16 and an electrode opening cap 48 (FIG. 8(g)). After dicing, the electrode cap 48 is opened (FIG. 8(h)). The insulating layer beneath the cap 48 over the bonding pads 36 is removed before providing connection to electrode 26 (electrode pad 36) (FIG. 8(i)). The finished device 10 is then wired and packaged.

In this configuration, no separate feedthrough channel is fabricated in the P-type silicon. A thin metal feedthrough, i.e., electrode 26, located under the anodic bonding region, is fabricated on the glass substrate 14. Prior to anodic bonding with silicon diaphragm assembly 12, an insulating layer 32 of Pyrex glass film is sputter deposited over the glass substrate 14 and the electrode area of the glass substrate 14, except the area of pad 36. This layer 32 is used as both an intermediate layer for anodic bonding and an insulation layer of the bottom electrode for touch mode operation.

The device 10 of FIGS. 8(a)–(i) has many advantages such as low cost, wafer-level seal and high performance. A two-step glass sputtering process may be used and further enhances the sensor sensitivity: One step to bond Si (42) to glass (14) and one step to define $d_{min}$ on top of the electrode (26).

Figure 9:
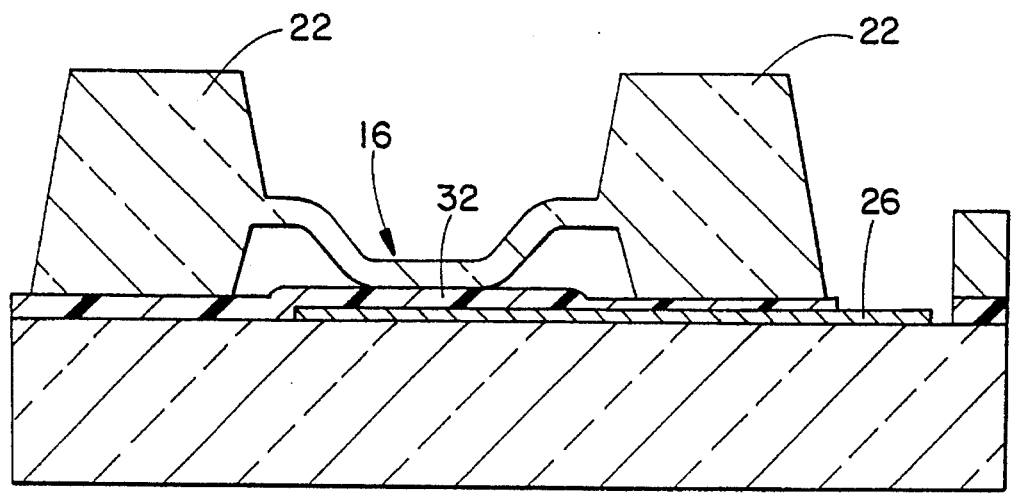
FIG. 9 is a cross-sectional view of the device of FIG. 1 operating in the touch mode; and, FIG. 10 is a pressure-voltage characteristic curve of the device of FIG. 1.

The preferred operation mode of the capacitive pressure sensor 10 is the touch mode. Sensors operating in this mode exhibit a much better performance than the conventional capacitive sensors in some industrial applications where monitoring the pressure over a range is desired. When it is properly designed and fabricated, the sensor 10, as shown in FIG. 9, operates with the diaphragm 16 touching the electrode 26 through insulating layer 32. The touched area varies is a linear function of the applied pressure. Consequently, the capacitance varies as defined by equations [1] and [2] and also varies with pressure nearly linearly in the touch mode region.

Figure 10:
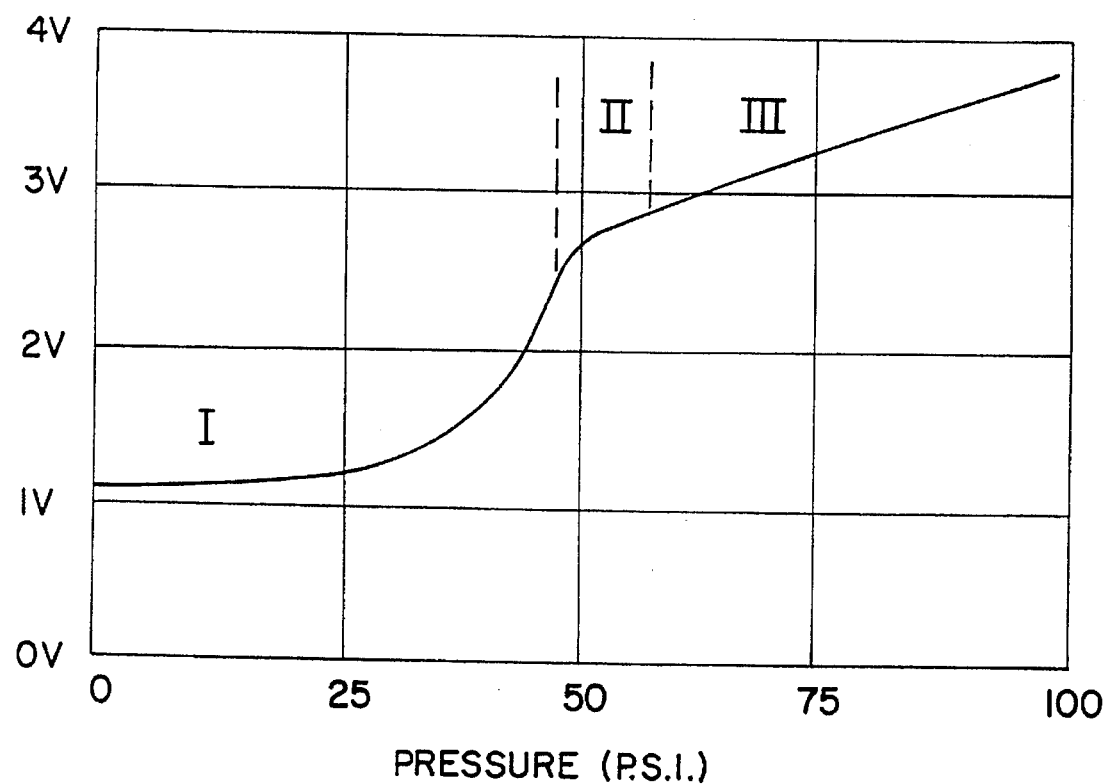

The typical sensor characteristics are shown in FIG. 10, where three operating regions are identified. Region I is the non-linear non-touch region i.e., the diaphragm and insulating layer make no contact. A typical non-linear relationship between the capacitance and pressure is shown. Region II shows the transition characteristics when the diaphragm 16 of the sensor 10 starts to touch the insulating layer 32 of the electrode 26. A small hump is present on the curve, the result of the combined capacitances of the touched and the untouched areas. In the region III, a near linear capacitance-to-pressure relationship is observed. This property is basically due to the contribution of the touched area which grows with the increased pressure. This linear region of operation provides significant operational advantages not heretofore known.

For the touch mode pressure sensor 10, the position of touch point can be adjusted by design parameters to allow the sensor to exhibit a linear behavior in a pressure range of interest. This gives the sensor large design flexibility for different applications with a minor process modification. For instance, the pressure range of interest for a passenger tire is around 50 PSI and that for a truck tire is around 100 PSI. The only minor change in sensor fabrication will be the P+ diffusion time.

The invention described herein has significant advantageous features. First, the feedthrough of the metal electrode 26 (preferably comprising Cr—Pt—Cr), having a selected thickness of 0.1 to 0.3 microns, overcoated with a glass layer 32 having a selected thickness of 0.3 to 3.0 microns, and subjected to a selected thermal cycle, facilitates a reliable seal for the evacuated chamber 34 yet allows access to the electrode for sensing.

Second, the structure of the sensor is robust, allowing for stability, high performance, and high reliability. More particularly, the dimensions of the frame 22 and wall 20 are selected to withstand harsh environments in both manufacturing of the sensor and use.

Third, when operating in the preferred touch mode, performance is enhanced by linear operation when zero suppression is used, overload protection is build-in, and sensitivity is greatly increased. The extent of linearity depends on the diaphragm thickness, the gap below the diaphragm and other dimensional factors. And, zero suppression may be accomplished for linear operation by any suitable measurement circuit. Further, the sensor is protected against overload pressure since the diaphragm will only touch the substrate, and not break, or short circuit, as a result of increased pressure. Only an increased touched area will result from overload pressure. Likewise, the sensitivity of the sensor is increased in the touch mode since the capacitance has an equivalent gap equal to the smallest possible $d_{min}$.

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

Having thus described the invention, I claim:

1. A method for forming a capacitive pressure sensor comprising steps of:

etching a first and second gap on a first side of a silicon wafer, the first and second gaps being separated by a dividing wall;

performing a diffusion process to form a p+ layer in the gaps;

depositing metal in the form of an electrode and a pad on a surface of a substrate, the substrate having a first portion and a second portion, the electrode spanning the first and second portions and the pad being dispersed in the second portion;

sputtering glass on the surface and the electrode;

deforming the glass around the electrode;

bonding the silicon wafer to the substrate so the first gap is aligned with the first portion of the substrate and the second gap is aligned with the second portion of the substrate, the first gap and the first portion defining a chamber;

etching a second side, opposite the first side, of the wafer to form (1) a diaphragm aligned with the first gap and the first portion, and (2) a cap aligned with the second gap and the second portion; and, removing the cap and corresponding portions of the glass on the electrode to expose the electrode, whereby the chamber is sealed as a result of the deforming of the glass around the electrode and the bonding.

2. The method as set forth in claim 1, further comprising selecting a thickness of the glass such that the glass deforms around the electrode.

3. The method as set forth in claim 2 wherein the selecting comprises selecting the thickness to be 0.3–3 microns.

4. The method as set forth in claim 1 wherein the etching to form the first and second gaps, the diaphragm and the cap defines a frame structure dimensioned such that the sensor withstands large external forces and temperature extremes thereby maintaining stability.

5. The method as set forth in claim 1 further comprising evacuating the first gap while the wafer and the substrate are bonded.

6. The method as set forth in claim 1 wherein the deforming and bonding comprise exposing the substrate and silicon wafer to a selected thermal cycle.

7. The method as set forth in claim 6 wherein the selected thermal cycle comprises:

exposing the glass substrate, deposited metal electrode, and sputtered glass to a first temperature for approximately one-half hour;

exposing the glass substrate, deposited metal electrode, and sputtered glass and silicon wafer to a second temperature for approximately one half hour to bond the silicon wafer to the substrate; and cooling the substrate, deposited metal electrode, sputtered glass, and bonded silicon wafer slowly for approximately one hour.

8. The method as set forth in claim 7 wherein the first temperature is approximately 500° C.

9. The method as set forth in claim 7 wherein the second temperature is in the range of 350° C. to 400° C. to reduce residual stress the sensor.

* * * * *